United States Patent [19]
Moisin

[11] Patent Number: 6,122,182
[45] Date of Patent: Sep. 19, 2000

[54] DIRECT AC TO AC POWER CONVERSION APPARATUS FOR CONTROLLING POWER DELIVERED TO A LOAD

[76] Inventor: Mihail Moisin, 8 Druce St., Brookline, Mass. 02146

[21] Appl. No.: 09/154,990

[22] Filed: Sep. 17, 1998

Related U.S. Application Data

[60] Provisional application No. 60/077,751, Mar. 12, 1998.

[51] Int. Cl.[7] .................................................. H02M 1/12
[52] U.S. Cl. .............................................................. 363/39
[58] Field of Search .................................. 363/8–10, 39, 363/157–161, 164, 170, 171

[56] References Cited

U.S. PATENT DOCUMENTS

| | | | |
|---|---|---|---|
| 4,833,588 | 5/1989 | Schauder | 363/159 |
| 4,896,091 | 1/1990 | Kislovski | 323/253 |
| 5,005,115 | 4/1991 | Schauder | 363/159 |
| 5,010,471 | 4/1991 | Klaassens et al. | 363/160 |

*Primary Examiner*—Adolf Deneke Berhane
*Attorney, Agent, or Firm*—Charles Bickoff

[57] ABSTRACT

An AC Power and Frequency Apparatus useful for supplying power to an AC receptive load. Said apparatus facilitates said power and frequency control without first converting the AC input to DC and then subsequently converting said DC signal to AC. The elimination of the DC conversion stage beneficially improves the performance of the apparatus in terms of lower Total Harmonic Distortion and higher Power Factor. Additionally, the reliability of the device is significantly enhanced by elimination of the DC storage capacitor common to prior art utilizing a DC conversion stage. The present invention is particularly useful in controlling power delivered to gas discharge lamps and the like. The device accomplishes the AC power control by switching at least one energy storage inductor with an electronically controlled switch. Switching the electronically controlled switch between the on and off states causes the inductor to reverse polarity and transfer the stored energy to the load through a resonant frequency and voltage increasing circuit.

33 Claims, 3 Drawing Sheets

PRIOR ART

DIRECT AC TO AC POWER CONVERSION APPARATUS FOR CONTROLLING POWER DELIVERED TO A LOAD

CROSS-REFERENCES TO RELATED APPLICATIONS

This application arises from Provisional Application Ser. No. 60/077,751 for a Direct AC to AC Power Conversion Apparatus for Controlling Power Delivered to a Load filed on Mar. 12, 1998.

STATEMENT REGARDING FEDERALLY SPONSORED RESEARCH OR DEVELOPMENT

Not applicable

MICROFICHE APPENDIX

Not Applicable

BACKGROUND

1. Field of the Invention

The present invention pertains to the field of power converters and utilizes a direct A.C. input to A.C. output conversion technique without an intervening D.C. conversion stage. This D.C. stage is responsible for the high total harmonic distortion, THD, and low power factors common to prior art. The control of THD and power factor correction are responsible for the high complexity of electronic ballasts and similar circuits driving high voltage A.C. devices.

2. Prior Art

In general, such apparatus have been designed to convert an A.C. voltage input to D.C. which in turn is converted to a high voltage, high frequency, A.C. source suitable for driving an A.C. receptive load. By their very nature, these circuits exhibit poor power factor and total harmonic distortion characteristics as well as lower electrical efficiency and reliability. Much of the complexity of previous inventions has been aimed at remedying these short comings at the expense of higher costs and lower reliability. It is well known in the art that reliability is inversely affected by the number of components.

A common power inverter application is to provide compatible A.C. power to operate fluorescent lamps. Fluorescent lamps are commonly used to provide illumination, particularly in industrial environments where their economy of power utilization is highly desirable. Because of their greater efficiency in converting electricity to light, the cost of utilization is significantly reduced when compared to incandescent lighting.

A common limitation of these devices has been that they have required sophisticated circuitry to control the above mentioned lamps. Most modem electronic fluorescent lamp ballasts utilize a D.C. to A.C. inverter circuit to strike and supply operating power to the lamps. As control circuitry is added to accomplish regulation or dimming of the light source, the complexity and cost has historically increased dramatically while the reliability and manufacturing consistency have decreased. Additionally the D.C. rectification and power storage stage interacts in an undesirable manner to cause high total harmonic distortion, THD, and a lower power factor thereby requiring further complexity to compensate for these defects.

The present invention addresses the above limitations in several ways. The first is that the apparatus described herein eliminates the prime cause of limited reliability, the power storage electrolytic capacitor. Secondly, the preponderance of existing electronic ballast circuits utilize a half bridge to control power delivered to the load. Because of its very nature, control is only on one half of the cycle, thereby limiting controllability. Additionally, the diode bridge is responsible for a lower efficiency, lower Power Factor, and Increased THD. By way of example, each diode has a voltage drop of 0.7 volts. In a 100 watt supply the diode bridge alone is responsible for a voltage drop of 2.8 volts which yields a loss of 2.8 watts or almost 3 percent lower efficiency. To achieve a high power factor the load should be resistive in nature. These effects are almost totally eliminated by the absence of the DC conversion stage from the design of the present invention.

SUMMARY

The invention herein described is for a direct AC to AC power energy storage circuit which is useful to control the power level supplied to fluorescent lamps and other high voltage AC loads. The method utilized in controlling the power output involves switching an input energy storage inductor on and off. Switching at that rate assures the complete transfer of energy stored in the inductor to the resonant circuit which drives the load at a high frequency. Switching the input energy storage inductor with an electronic switch causes the inductor to reverse polarity when it is switched between the on and off states thereby transferring the stored energy through the resonant circuit to the load. Additionally, the switch control circuit has the ability to vary the duty cycle, current amplitude, and frequency supplied to the resonant circuit thereby controlling the power delivered to the load. Varying the power delivered to the load is particularly useful when the load is a gas discharge lamp as the lamp brightness is controllable through varying these parameters singularly or in multiplicity.

THE INVENTION OBJECTS

Several objects and advantages of the present invention include:

a. Providing a power converter having an A.C. input and A.C. output without an intermediate D.C. converter stage, thereby improving the power factor and significantly reducing total harmonic distortion.

b. Providing a direct A.C. to A.C. power converter having a low Total Harmonic Distortion, THD, less than 10 percent and high power factor, greater than 95 percent. Said low THD and high power factor being a direct result of the elimination of the D.C. conversion rectifier bridge and also the included electrolytic storage capacitor. These elements directly require complex compensation and control circuitry to minimize the THD and raise the power factor.

c. Providing an A.C. power converter with a reliability approaching a magnetic ballast through the elimination of the electrolytic power storage capacitor.

d. Providing an A.C. power converter with three methods of output power control. These being frequency, duty cycle, and amplitude control.

e. Providing an A.C. power converter wherein said amplitude control is also used as a crest factor control.

Another object is to provide an A.C. power converter wherein the symmetric characteristics of the A.C. wave form is controllable by choice of input inductance.

A further object is to provide a duty cycle less than or equal to 50 percent to assure complete transfer of energy to the load.

A further object is to provide an A.C. power converter which can dim a gas discharge lamp or reduce power delivered to the load by varying duty cycle, amplitude, frequency or a combination thereof.

Another object is to provide an A.C. power converter which has two ways to control the duty cycle.

An additional object is to provide an A.C. power converter which symmetrically controls duty cycle.

Additional objects will be obvious to those skilled in the art from the drawings and detailed description which follows.

DRAWINGS

DETAILED DESCRIPTION OF ILLUSTRATED EMBODIMENTS AND THE BEST MODE

The following description illustrates the invention by way of example, not by way of limitation, the principles of the invention. The description will clearly enable one skilled in the art to make and use the invention. It describes embodiments, variations, and adaptations including what I believe to be the best mode.

Figure 1:
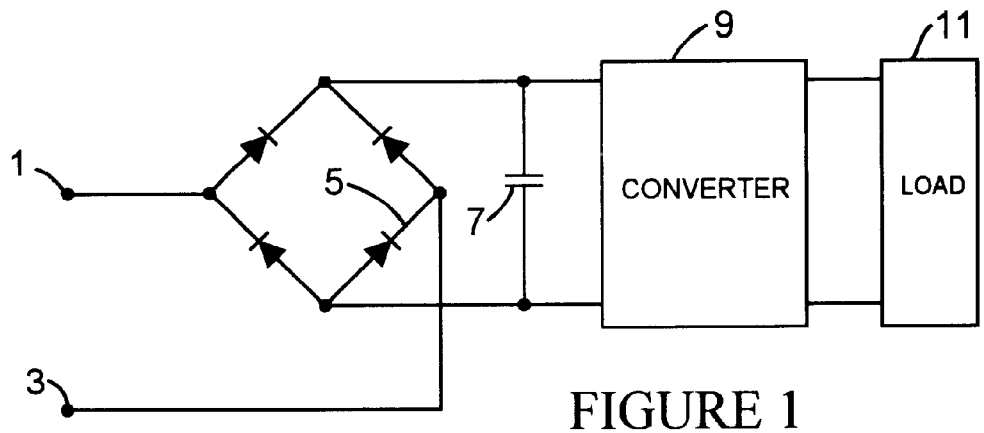
FIG. 1 is a simplified schematic of a prior art converter circuit comprising A.C. input, A.C. to D.C. conversion, line conditioning and Energy storage converter, D.C. power storage, D.C. to A.C. power converter, and A.C. load.

FIG. 1 illustrates, by way of example, a typical topology of an electronic ballast for driving fluorescent lamps, gas discharge lamps, and A.C. loads requiring a high frequency high A.C. voltage source. Typically such circuits receive an A.C. input voltage at terminals 1 and 3. The A.C. signal is rectified by diode bridge 5 and storage and filter capacitor 7 into a D.C. voltage. The diode switching and characteristics of the electrolytic filter and energy storage capacitor 7 are primarily responsible for the total harmonic distortion, THD, and lower power factor typical of the prior art. In fact the complexity of these designs is in large part due to the need to correct these deficiencies. The D.C. voltage is generally boosted and converted into high voltage A.C. by a half bridge circuit which is generally controlled on the positive side of the inverter, i.e. dimming and level control. The output of the inverter is connected to the A.C. receptive load.

Figure 2:
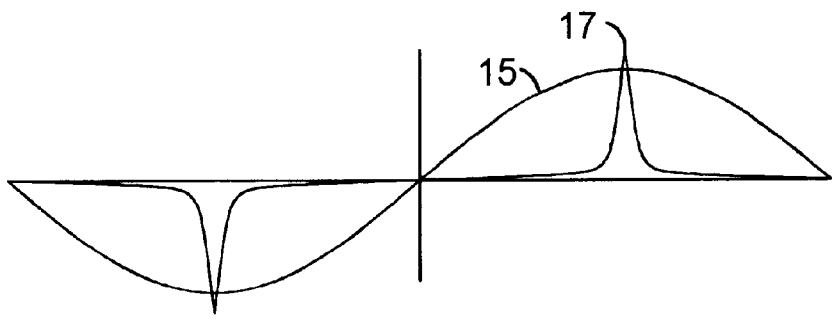
FIG. 2 shows the voltage and current waveforms at the A.C. input of FIG. 1.

FIG. 2 shows the A.C. input waveforms at the terminals of the rectifier bridge 5. Item 15 depicts a typical 60 Hz wave form. Due to the fact that the capacitor 7 in FIG. 1 can charge only near the peak voltage, a current spike coincident with the A.C. crest occurs. This spike is largely responsible for the THD. Additionally, the reliability of the prior art circuit is controlled by the life of the electrolytic capacitor 7 which is typically 2000 hours at 105° C. This results in a typical electronic ballast MTBF, mean time between failures, of approximately 100,000 hours as opposed to 1,000,000 hours for the classical magnetic ballast which is comprised of solely passive components.

The present invention improves reliability and eliminates the inherently high THD and low power factor by eliminating the primary causal elements from the design. These are the rectifier bridge 5 and the storage capacitor 7. The four diodes in the rectifier bridge 5 typically have a voltage drop of 0.7 volts each. In a 100 watt power supply this results in approximately a 3 watt or 3 percent loss in efficiency.

Figure 3:
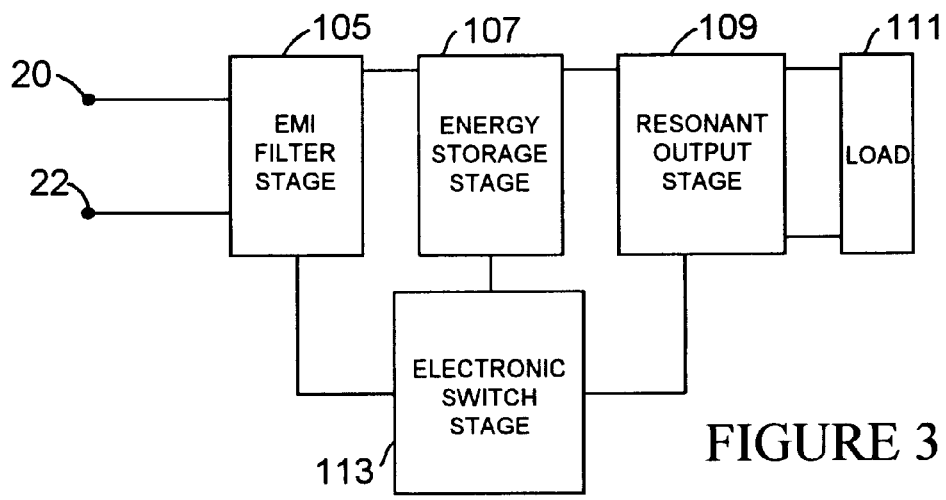
FIG. 3 is a block diagram of the present invention

FIG. 3 illustrates a block diagram of the present invention. An A.C. signal is presented at terminals 20 and 22. These terminals in-turn are connected to an EMI Filter Stage, 105, useful for isolating the remainder of the circuitry from the A.C. line and thereby limiting the transmission of conducted EMI noise on to the A.C. line. The EMI Filter Stage, 105, is connected to the Energy Storage Stage, 107, which contains a voltage reference and energy storage inductors useful for storing and transferring stored energy to the Resonant Output Stage, 109. One leg of the output of the Energy Storage Stage, 107, is connected to the first input terminal of the Resonant Output Stage, 109, which in turn is connected to the Load, 111. The second leg of the output of the Energy Storage Stage, 107, is connected to a first terminal of the Electronic Switch Stage, 113, and the second terminal of the Electronic Switch Stage is connected to the second input terminal of the Resonant Output Stage, 109.

Figure 4:
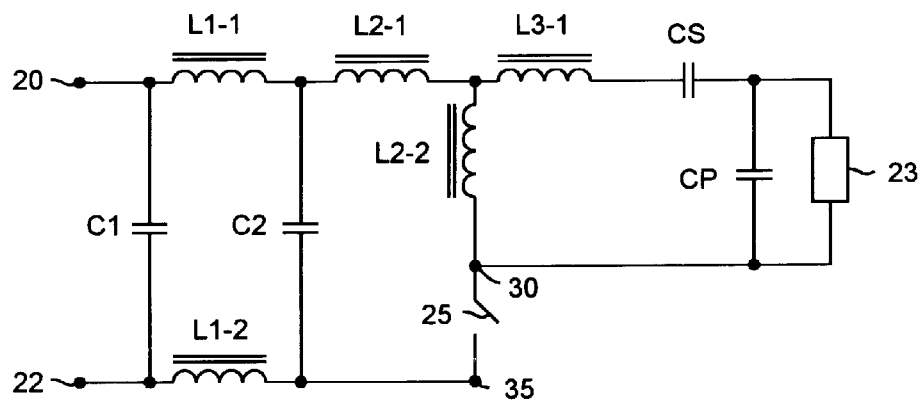
FIG. 4 is a simplified schematic of the present invention.

FIG. 4 depicts a simplified schematic of the present invention. An A.C. signal is presented at terminals 20 and 22 which also serve as the inputs to a line filter for preventing EMI signals and noise from being reflected on to the A.C. input line. Capacitor $C_2$, which serves as part of the line filter, also acts as a voltage source and is placed across the output terminals of the EMI filter. Inductors L2-1 and L2-2 serve as energy storage elements for delivering power to the A.C. receptive load and are magnetically coupled by being wound on the same magnetic core. L2-1 is optional and while it is beneficial in presenting a symmetrical A.C. signal to the load, is not necessary for operation of the circuit. A first end of energy storage inductor L2-1 is connected to the high side junction of the EMI filter and capacitor C2, while the second end of energy storage inductor L2-1 is connected to the junction of inductors L3-1 and L2-2. The second end of inductor L2-2 is connected to a first end of electronically controlled switch 25 and the neutral junction of parallel resonating capacitor $C_p$ and the load. A second end of resonating energy storage inductor L3-1 is connected to series resonant capacitor $C_s$, while the second end of series resonant capacitor $C_s$ is connected to the high side end of parallel resonating capacitor $C_p$ and the load. Finally, the second end of electronically controlled switch 25 is connected to the low side of the line.

In principal, the operation of the circuit is as follows. At power up, capacitor C2 charges and acts as a low impedance voltage source for charging energy storage inductor L2-2 and the electronically controlled switch 25 is closed which transfers inductor L2-2's stored energy to the load during the positive phase of the cycle. L2-2 acts as a flyback inductor. When the electronically controlled switch 25 opens, the polarity of energy storage inductor L2-2 is instantaneously reversed and the stored energy is completely transferred to the load as the negative phase of the cycle, thereby completing the full A.C. power cycle. The switching continues controlled by the frequency of switching determined by the electronically controlled switch. The series-parallel resonant circuit boosts the voltage to a level determined by the component values of the resonant circuit, thereby producing the required A.C. voltage level to run the load. With optional inductor L2-1 deleted and the electronically controlled switch in the on state, the resonating components are inductor L3-1, series resonating capacitor $C_s$, and parallel resonating capacitor $C_p$. During the off state of the electronically controlled switch, the resonating components are inductors L2-2 and L3-1, series resonating capacitor CS, and parallel resonating capacitor $C_p$. It can be seen from FIG. 3 that the inductance of the off state with inductor L2-1 absent is higher than the on state and will result in an asymmetrical wave form which may or may not be desirable. If a symmetrical A.C. output desired, this can be accomplished by adding inductor L2-1 to the circuit. As can be seen, if the value of L2-1 and L2-2 are identical, the resonating circuit will be identical on both the positive and negative A.C. energy transfers to the load.

Furthermore, it is highly desirable to completely deliver the stored energy of inductor L2-2 to the load during each half of the switching cycle.

Figure 5:
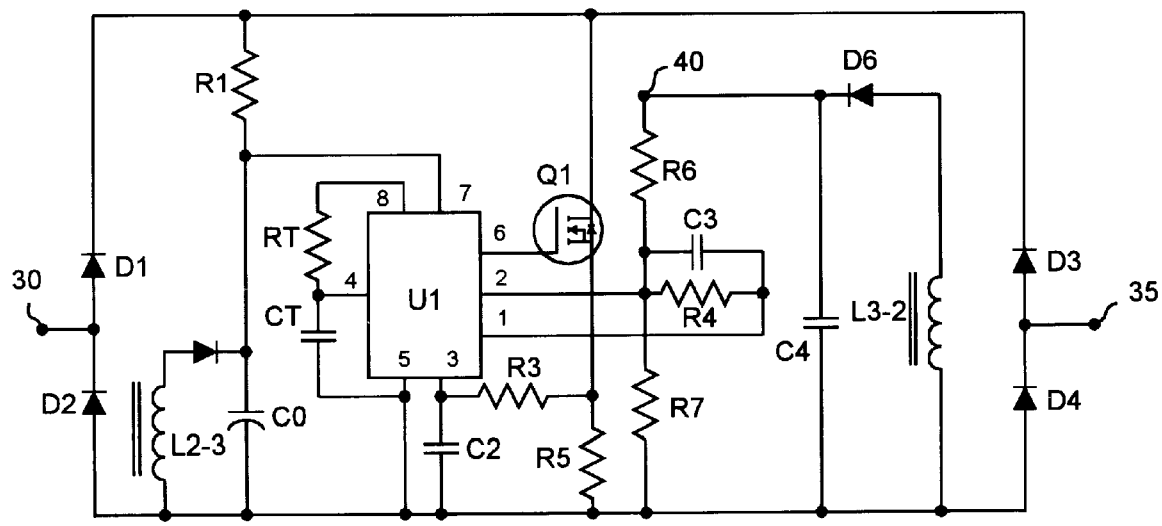
FIG. 5 is a schematic of a electronically controlled switch to control the present invention.
Figure 6:
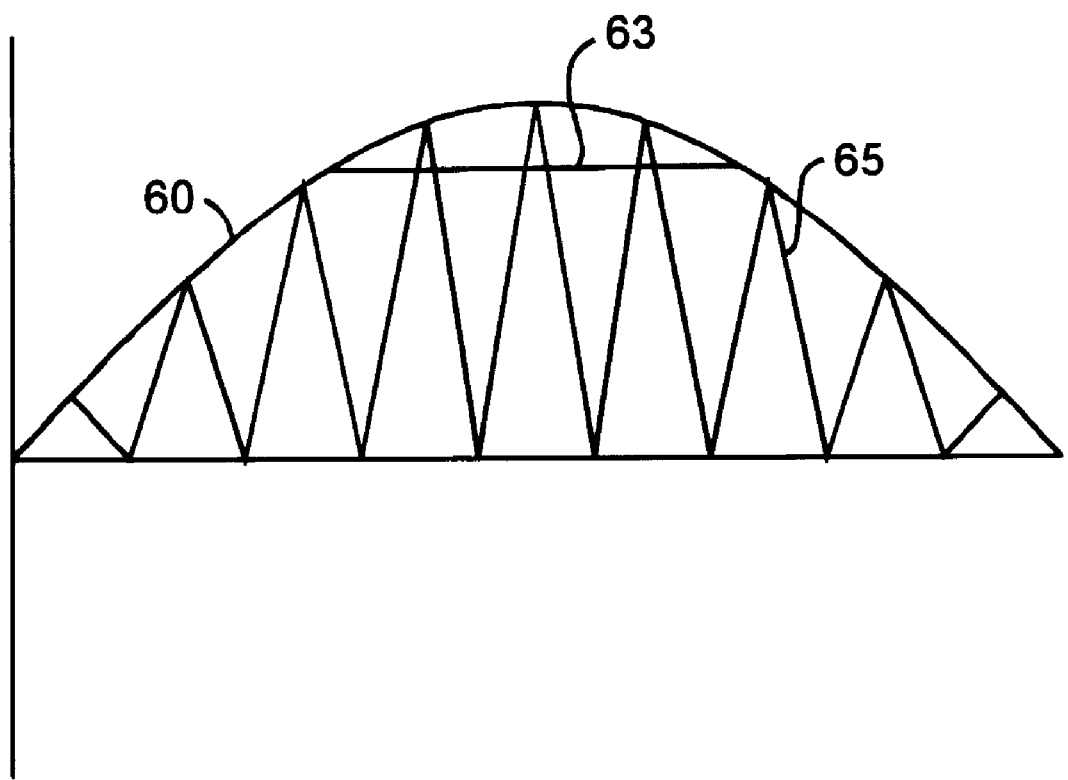
FIG. 6 is the amplitude control waveform of the present invention.

FIG. 5 is a schematic of an electronic switch to control the energy storage and polarization of inductor L2-2. The characteristics of the switch allow the on-off state to be controlled in terms of frequency, duty cycle, and amplitude.

Diodes D1 through D4 form a rectifier bridge to provide a D.C. switch voltage for the unipolar FET switch Q1. It will be recognized by those skilled in the art that the unipolar switch could be replaced by a bipolar switch with the result that diodes D1 through D4 could be eliminated. A first terminal of the electronically controlled switch and the rectifier bridge is node 30 as shown in FIGS. 3 and 4 while the second terminal is node 35. The anode of diode D1 is connected to the cathode of diode D2 and node 30. The cathode of diode D1 is connected to the positive voltage rail, a first end of resistor R1, the drain of FET transistor Q1, and the cathode of diode D3.

Current limiting resistor R1, diode D5, inductor L2-3, and electrolytic storage capacitor C0 form a local power supply for the switch controller U1. A second end of resistor R1 forms a junction with pin 7 Vcc of controller U1, the cathode of diode D5, and the positive end of storage capacitor C0. The anode of diode D5 is connected to a first end of inductor L2-3 and the second ends of inductor I2-3 and storage capacitor C0 are attached to the D.C. virtual ground rail of said switch circuit. In this particular case Vcc is 15 volts D.C.

U1 is a current mode controller built around a latching pulse width modulator, PWM. The choice of this circuit is by way of example. Similar results can be obtained using other circuits of this nature. In this particular case, U1 is a Motorola UC3845. Pin 5 is tied to the D.C. virtual ground rail and as previously noted pin 7 is tied to the 15 volt output of the local power supply. The RC timer formed by Resistor $R_T$ and capacitor $C_T$ serves as a frequency control. Choice of the value of these two components sets the oscillator frequency and the output duty cycle of controller U1. A first end of resistor $R_T$ is attached to pin 8, Vref of controller U1, while the second end of resistor $R_T$ is attached to a first end of capacitor $C_T$ and pin 4, $R_T/C_T$. The second end of capacitor $C_T$ is attached to the virtual D.C. ground rail and ground pin 5 of controller U1.

First ends of capacitor C3 and resistor R4 are mutually connected to pin 2, $V_{FB}$, of controller U1 and the junction of resistors R7 and R6, while the second ends of resistor R4 and capacitor C3 are connected to pin 1, compensation. The second end of resistor R6 is connected to the cathode of diode D6 and a first end of bypass capacitor C4. This node, 40, is a voltage proportional to the output voltage of the circuit at the A.C. load. Resistors R6, R7, and R4 as well as capacitor C3 form an error compensation circuit for stabilizing the current mode topology. This effectively controls the duty cycle of the output pin 6 of controller U1. The basic design of this controller limits the duty cycle to an upper limit of 50 percent. It should be noted by those skilled in the art that the circuit could be run at a duty cycle greater than 50 percent, but would only partially transfer the stored energy. Pin 6 of controller U1 is connected to the gate of MOSFET transistor Q1 which serves as the switch for controlling the circuit as depicted in FIG. 3.

The anode of diode D6 is connected to one end of inductor L3-2 while the second end of inductor L3-2 is connected to the virtual D.C. ground rail. Inductor L3-2 is wound on the same magnetic core as inductor L3-1 thereby generating a voltage proportional to the A.C. voltage at the load. When the load is either open of removed the voltage at pin 1 of controller U1 will be at its lowest state and no drive pulses will appear at the output pin 1 of controller U1. Additionally, when the load is a fluorescent lamp and the lamp is at end of life, the starting voltage will continue to rise attempting to start the lamp. However, due to the internal 1.0 volt clamp of the current sense comparator, the maximum peak switch current will be limited to safe levels.

A first end of Capacitor C2 and a first end of resistor R3 are connected to the compensation pin 1 of controller U1. The second end of resistor R3 is connected to a first end of current sense resistor R5 and the source of MOSFET transistor Q1. The second end of current sense resistor R5 is connected to the virtual D.C. ground rail. The voltage across sense resistor R5 is monitored by the Current Sense Input pin 3 of controller U1 and compared to a level derived from the Error Amplifier Output. Resistor R5 thereby serves as a current amplitude control and crest factor control.

The switch circuit herein described controls the output of the A.C. to A.C. converter circuit as shown in FIG. 3 by controlling the duty cycle, current amplitude, and frequency. Secondarily variation of these three factors either singularly or multiply can effect dimming of the load which is particularly useful when controlling a fluorescent lamp load.

In particular, dimming can be instituted by varying resistor RT to shift the frequency, resistor R5 to control the current amplitude, and resistor R7 to vary the duty cycle. The duty cycle may also be varied by injecting a control voltage at pin 2 of controller U1.

The basic simplicity of the circuit allows the potential for extremely small packaging volume and as such the potential for packaging the circuit within the confines of the edison base of a lamp exists.

Additionally, the topology of the EMI filter may be beneficially revised to include non-magnetically coupled inductors arranged in a differential or common mode configuration.

FIG. 5 depicts the amplitude control waveform of the switch discussed as FIG. 4. 60 is one half-cycle of the low frequency A.C. input voltage. The amplitude of the high frequency output, 65, of the switch is controlled by R5 in FIG. 4 and is shown as a clamp level 63. The frequency of operation is generally above 20 kilohertz, but lower frequency modes of operation are possible.

As will be obvious to persons skilled in the art, various modifications, adaptations, and variations of the specific disclosure can be made without departing from the teaching of the invention.

Having described the invention, what is claimed as new and desired to be secured by letters patent is:

1. In a direct AC to AC power increasing apparatus for connection with an AC receptive load and with an input power source supplying an AC input voltage, the improvement comprising:

a voltage source chargeable by said AC input voltage, a polarity reversing energy storage means in circuit with said voltage source for supplying an AC signal to a resonant circuit means, said series parallel resonant circuit consisting of an inductor connected in series with a series capacitor and in series with a parallel capacitor which in turn is parallel to the load, and the values of said series and said parallel capacitors determining the dominance of the series and parallel capacitors, an electronically controlled high frequency switch in circuit with said polarity reversing energy storage means wherein a polarity reversal occurs responsive to opening and closing said electronically controlled high frequency switch wherein said polarity reversing energy storage means acts as a switching element, said polarity reversal, causal to supplying an AC voltage signal to a resonant circuit means for electrical connection with the AC receptive load, and said resonant circuit means generating a high frequency AC voltage in response to said AC voltage signal, and further controlling a level of power supplied to the AC receptive load in response to said electronically controlled high frequency switch.

2. In a direct AC to AC power increasing apparatus according to claim 1, the further improvement wherein said voltage source further serves as a high frequency shunt and an element within an EMI filter for isolating said direct AC to AC power increasing apparatus from said input power source.

3. In a direct AC to AC power increasing apparatus according to claim 1, the further improvement wherein said polarity reversing energy storage means is an inductor, wherein said inductor provides an asymmetrical AC signal to said resonant circuit means, and said inductor is charged with energy during an on-state of said electronically controlled high frequency switch and delivers the stored energy during an off-state of said electronically controlled high frequency switch.

4. In a direct AC to AC power increasing apparatus according to claim 1, the further improvement wherein said electronically controlled high frequency switch is controllable and preferably operates at a maximum duty cycle of 50 percent; and said duty cycle limitation assures complete transfer to the resonant circuit means of the stored energy resident in said polarity reversing energy storage means during each AC half cycle.

5. In a direct AC to AC power increasing apparatus according to claim 1, the further improvement wherein said electronically controlled high frequency switch is controllable and operates at a duty cycle exceeding 50 percent; and said duty cycle partially transfers to the resonant circuit means the stored energy resident in said polarity reversing energy storage means during each AC half cycle.

6. In a direct AC to AC power increasing apparatus according to claim 1, the further improvement wherein said electronically controlled high frequency switch delivers a signal to said resonant circuit means for controlling power delivered to the AC receptive load by controlling at least one of the group including a current amplitude control means, a duty cycle control means, and a frequency control means.

7. In a direct AC to AC power increasing apparatus according to claim 6, the further improvement wherein said electronically controlled high frequency switch controls the current amplitude supplied to said resonant circuit means thereby controlling the power delivered to said AC receptive load, and said electronically controlled high frequency switch additionally acts as a crest factor control.

8. In a direct AC to AC power increasing apparatus according to claim 6, the further improvement wherein said electronically controlled high frequency switch settably controls the frequency of said AC signal input to said resonant circuit means;

said frequency of said AC voltage signal thereby controlling the power delivered to said AC receptive load.

9. In a direct AC to AC power increasing apparatus according to claim 6, the further improvement wherein said electronically controlled high frequency switch settably controls the duty cycle of said AC signal input to said resonant circuit means;

the duty cycle of said AC voltage signal thereby controlling the power delivered to said AC receptive load.

10. In a direct AC to AC power increasing apparatus according to claim 3, the further improvement wherein said polarity reversing energy storage means consists of a first and a second inductor, wherein said first and second inductor provides an AC signal to said resonant circuit means; and the values of each of said first and second inductors determine the symmetry of said AC voltage signal delivered to said AC receptive load.

11. In a direct AC to AC power increasing apparatus according to claim 10, the further improvement wherein a first inductor cooperates with the resonant circuit means during the on-cycle of the electronically controlled high frequency switch, and a second inductor cooperates with the resonant circuit means during the off-cycle of the electronically controlled high frequency switch.

12. In a direct AC to AC power increasing apparatus according to claim 1, the further improvement wherein said electronically controlled high frequency switch has a controllable pulse width modulator circuit, and said controllable pulse width modulator circuit has a first input wherein a timer controls the frequency output of said controllable pulse width modulator circuit.

13. In a direct AC to AC power increasing apparatus according to claim 1, the further improvement wherein said electronically controlled high frequency switch has a controllable pulse width modulator circuit, and said controllable pulse width modulator circuit has a second input wherein a reference current acts to control the current amplitude of said controllable pulse width modulator circuit.

14. In a direct AC to AC power increasing apparatus according to claim 1, the further improvement wherein said electronically controlled high frequency switch has a controllable pulse width modulator circuit, and said controllable pulse width modulator circuit has a third input wherein the duty cycle of said controllable pulse width modulator circuit is controlled through the choice of values of a resistor divider.

15. In a direct AC to AC power increasing apparatus for connection with an AC receptive load and with an input power source supplying an AC input voltage the improvement comprising:

a voltage source chargeable by said AC input voltage, said voltage source further serves as a high frequency shunt and an element within an EMI filter for isolating said direct AC to AC power increasing apparatus from said input power source, said EMI filter consisting of a first capacitor disposed across both input terminals of the input power source, a first terminal of said first capacitor being connected to a first terminal of a first inductor, a second terminal of said first capacitor being connected to a first terminal of a second inductor, second terminal of said first inductor being connected to a first terminal of a second capacitor additionally serving as said voltage source, and said second terminal of said second capacitor connected to said second terminal of said second inductor, a polarity reversing energy storage means in circuit with said voltage source for supplying an AC signal to a resonant circuit means, an electronically controlled high frequency switch in circuit with said polarity reversing energy storage means wherein a polarity reversal occurs responsive to opening and closing said electronically controlled high frequency switch causing said polarity reversing energy storage means to act as a switching element, said polarity reversal, causal to supplying an AC voltage signal to a resonant circuit means for electrical connection with the AC receptive load, said AC receptive load being a gas discharge lamp device, and said resonant circuit means generating a high frequency AC voltage in response to said AC voltage signal, and further controlling a level of power supplied to said gas discharge lamp device in response to said electronically controlled high frequency switch.

16. In a direct AC to AC power increasing apparatus according to claim 15, the further improvement wherein said first inductor said first inductor and said second inductor being wound on a common magnetic core and poled in the same direction to provide for common mode rejection.

17. In a direct AC to AC power increasing apparatus according to claim 15, the further improvement wherein said first inductor and said second inductor being wound on a common magnetic core and poled in the opposite direction to provide for differential mode rejection.

18. In a direct AC to AC power increasing apparatus according to claim 15, the further improvement wherein said first inductor and said second inductor each being wound on an independent magnetic core result in a combination of common and differential mode rejection.

19. In a direct AC to AC power increasing apparatus according to claim 18, the further improvement wherein the size of said first and said second inductor as well as other circuit components are sufficiently small that the circuit can reside within an Edison base of a compact miniature fluorescent lamp.

20. In a direct AC to AC power increasing apparatus according to claim 15, the further improvement wherein said resonant circuit means is a series parallel resonant circuit, said series parallel resonant circuit consisting of an inductor connected in series with a series capacitor and in parallel with a parallel capacitor, said parallel capacitor in series with a pair of filaments of said gas discharge lamp for facilitating the starting of said gas discharge lamp, and the values of said series and said parallel capacitors determining the dominance of the series and parallel capacitors.

21. In a direct AC to AC power increasing apparatus according to claim 15, the further improvement wherein said electronically controlled high frequency switch is controllable; and said duty cycle limitation assures complete transfer to the resonant circuit means of the stored energy, resident in said polarity reversing energy storage means during each AC half cycle.

22. In a direct AC to AC power increasing apparatus according to claim 12, the further improvement wherein said electronically controlled high frequency switch controls the current amplitude supplied to said resonant circuit means thereby controlling the power delivered to said gas discharge lamp.

23. In a direct AC to AC power increasing apparatus according to claim 12, the further improvement wherein said electronically controlled high frequency switch controls the current amplitude supplied to said resonant circuit means thereby acting as a crest factor control.

24. In a direct AC to AC power increasing apparatus according to claim 15, the further improvement wherein said electronically controlled high frequency switch settably controls the frequency of said AC signal input to said resonant circuit means;

said frequency of said AC voltage signal thereby controlling the power delivered to said gas discharge lamp.

25. In a direct AC to AC power increasing apparatus according to claim 15, the further improvement wherein said electronically controlled high frequency switch settably controls the duty cycle of said AC signal input to said resonant circuit means;

the duty cycle of said AC voltage signal thereby controlling the power delivered to said gas discharge lamp.

26. In a direct AC to AC power increasing apparatus according to claim 15, the further improvement wherein said polarity reversing energy storage means consists of a first and a second inductor wound on a common core and poled in the same direction, wherein said first and second inductor provides an AC signal to said resonant circuit means; and the values of each of said first and second inductors determine the symmetry of said AC voltage signal delivered to said gas discharge lamp.

27. In a direct AC to AC power increasing apparatus according to claim 26, the further improvement wherein a first inductor cooperates with the resonant circuit means during the on-cycle of the electronically controlled high frequency switch, and a second inductor cooperates with the resonant circuit means during the off-cycle of the electronically controlled high frequency switch.

28. In a direct AC to AC power increasing apparatus according to claim 15, the further improvement wherein said electronically controlled high frequency switch has a controllable pulse width modulator circuit.

29. In a direct AC to AC power increasing apparatus according to claim 28, the further improvement wherein said electronically controlled high frequency switch has a controllable pulse width modulator circuit, and said controllable pulse width modulator circuit has a plurality of control inputs.

30. In a direct AC to AC power increasing apparatus according to claim 28, the further improvement wherein said controllable pulse width modulator circuit has a first input wherein a timer controls the frequency output of said controllable pulse width modulator circuit.

31. In a direct AC to AC power increasing apparatus according to claim 28, the further improvement wherein said controllable pulse width modulator circuit has a second input wherein a reference current acts to control the current amplitude of said controllable pulse width modulator circuit.

32. In a direct AC to AC power increasing apparatus according to claim 28, the further improvement wherein said controllable pulse width modulator circuit has a third input wherein the duty cycle of said controllable pulse width modulator circuit is controlled through the choice of values of a resistor divider.

33. In a direct AC to AC power increasing apparatus according to claim 29, the further improvement wherein said control inputs are each controllable and utilized to vary the brightness of said gas discharge lamp with at least one of the group of said frequency output, said current amplitude, and said duty cycle being used to effect such control.

* * * * *